United States Patent
Aramendy et al.

(10) Patent No.: US 12,507,730 B2
(45) Date of Patent: Dec. 30, 2025

(54) REPLACEABLE MODULE FOR AN AEROSOL AND FLAVOR GENERATING DEVICE

(71) Applicant: PHILIP MORRIS PRODUCTS S.A., Neuchâtel (CH)

(72) Inventors: Flavie Aramendy, Neuchâtel (CH); Rui Nuno Rodrigues Alves Batista, Neuchâtel (CH); Cheng Peng, Hong Kong (CN); Yalcin Akpinar, Neuchâtel (CH); Alexandra Sereda, Neuchâtel (CH)

(73) Assignee: PHILIP MORRIS PRODUCTS S.A., Neuchâtel (CH)

( * ) Notice: Subject to any disclaimer, the term of this patent is extended or adjusted under 35 U.S.C. 154(b) by 313 days.

(21) Appl. No.: 18/040,379

(22) PCT Filed: Aug. 3, 2021

(86) PCT No.: PCT/EP2021/071673
§ 371 (c)(1),
(2) Date: Feb. 2, 2023

(87) PCT Pub. No.: WO2022/029123
PCT Pub. Date: Feb. 10, 2022

(65) Prior Publication Data
US 2023/0354894 A1 Nov. 9, 2023

(30) Foreign Application Priority Data
Aug. 5, 2020 (EP) .................................... 20189567

(51) Int. Cl.
*A24F 40/42* (2020.01)
*A24F 40/465* (2020.01)
*A24F 40/48* (2020.01)

(52) U.S. Cl.
CPC ............ *A24F 40/42* (2020.01); *A24F 40/465* (2020.01); *A24F 40/48* (2020.01)

(58) Field of Classification Search
CPC .............................. A24F 40/42; A24F 40/485
See application file for complete search history.

(56) References Cited

U.S. PATENT DOCUMENTS

| | | |
|---|---|---|
| 10,188,145 B2 | 1/2019 | Rado |
| 2004/0118396 A1 | 6/2004 | Hughes et al. |
| 2014/0096767 A1 | 4/2014 | Pearson |
| 2015/0366250 A1 | 12/2015 | Landau |

(Continued)

FOREIGN PATENT DOCUMENTS

| | | |
|---|---|---|
| CN | 211048398 U | 7/2020 |
| EA | 023124 B1 | 4/2016 |

(Continued)

OTHER PUBLICATIONS

International Search Report and Written Opinion issued Jan. 4, 2022 in PCT/EP2021/071673 filed on Aug. 3, 2021 11 pages.

(Continued)

*Primary Examiner* — Michael H. Wilson
*Assistant Examiner* — Ronnie Kirby Jordan
(74) *Attorney, Agent, or Firm* — Oblon, McClelland, Maier & Neustadt, L.L.P.

(57) ABSTRACT

A replaceable module is provided for an aerosol- and flavor-generating device, including an air chamber including an air inlet for an entrance of an airflow into the air chamber, an air outlet for an exit of a first portion of the airflow out of the air chamber, the air outlet to be connected to an aerosol-generating article to direct the first portion of the airflow through the aerosol-generating article, the air chamber further including an opening arranged at a circumference of the air chamber for an exit of a second portion of the airflow radially out of the air chamber, and holder for holding a flavor-generating article between the air inlet and (Continued)

the opening. A heating system for an aerosol- and flavor-generating device, an aerosol- and flavor-generating device, and a method of providing an airflow through a replaceable module for an aerosol- and flavor-generating device, are also provided.

14 Claims, 4 Drawing Sheets

(56) References Cited

U.S. PATENT DOCUMENTS

| | | | |
|---|---|---|---|
| 2016/0331039 A1 | 11/2016 | Thorens et al. | |
| 2017/0086506 A1* | 3/2017 | Rado | A24F 40/485 |
| 2019/0183183 A1 | 6/2019 | Ito | |

FOREIGN PATENT DOCUMENTS

| | | |
|---|---|---|
| EP | 3 504 988 A1 | 7/2019 |
| JP | 2017-522873 A | 8/2017 |
| JP | 2023-523024 A | 6/2023 |
| KR | 10-2019-0026929 A | 3/2019 |
| KR | 10-2019-0077328 A | 7/2019 |
| RU | 2 710 079 C2 | 12/2019 |
| WO | WO 2012/169905 A2 | 12/2012 |
| WO | WO 2013/083635 A1 | 6/2013 |
| WO | WO 2014/156537 A1 | 10/2014 |
| WO | WO 2018/037562 A1 | 3/2018 |
| WO | WO 2021/144331 A1 | 7/2021 |

OTHER PUBLICATIONS

Korean Notice of Allowance issued on Mar. 24, 2025 in Korean Patent Application No. 10-2023-7007550 (with unedited computer-generated English translation), 5 pages.

Combined Russian Office Action and Search Report issued in corresponding Russian Patent Application No. (with English Translation), 19 pages.

Japanese Office Action issued Mar. 14, 2024 in Japanese Patent Application No. 2023-507637 (with English Translation), 5 pages.

* cited by examiner

REPLACEABLE MODULE FOR AN AEROSOL AND FLAVOR GENERATING DEVICE

The invention relates to a replaceable module for an aerosol and flavor generating device, a heating system for an aerosol and flavor generating device, an aerosol and flavor generating device and a method of providing an airflow through a replaceable module for an aerosol and flavor generating device.

Electrically heated smoking systems or aerosol generating devices of the prior art do have a number of advantages, but there is still room for improvement in particular in providing aromatic notes and flavoring aspects when compared with a standard performance of conventional smoking articles, namely conventional cigarettes and cigars.

It is therefore an object of the invention to provide an improved aerosol generating device that provides improved aromatic notes and flavoring aspects.

The object of the present disclosure is solved by the subject-matter of the independent claims, wherein further embodiments are incorporated in the dependent claims. It should be noted that the aspects of the disclosure described in the following apply to the replaceable module for an aerosol and flavor generating device, the heating system for an aerosol and flavor generating device, the aerosol and flavor generating device and the method of providing an airflow through a replaceable module for an aerosol and flavor generating device.

According to an aspect of the present disclosure, there is provided a replaceable module for an aerosol and flavor generating device. The replaceable module comprises an air chamber. The air chamber comprises at least an air inlet for an entrance of an airflow into the air chamber.

The air chamber comprises an air outlet for an exit of a first portion of the airflow out of the air chamber. The air outlet is configured to be connected to an aerosol generating article to direct the first portion of the airflow through the aerosol generating article. The air chamber comprises at least an opening arranged at a circumference of the air chamber for an exit of a second portion of the airflow radially out of the air chamber. The air chamber comprises a holding unit for holding a flavor generating article between the air inlet and the opening.

The present replaceable module for an aerosol and flavor generating device allows a better performance in view of aromatic notes and flavoring aspects compared to conventional electrically heated smoking systems. The aromatic notes and flavoring aspects may be as good as for conventional cigarettes and cigars. This may ease a change of a user from conventional cigarettes and cigars to aerosol generating devices.

The aromatic notes and flavoring aspects are improved, because not only a flow of primary aerosol is provided by a mouthpiece at a mouth end of the aerosol generating article, delivering aerosol to the user's mouth, but a flow of aerosol mixed with flavor from the flavor generating article may optionally be provided. Additionally, a flow of aroma from the flavor generating article is provided by the opening(s) arranged at a circumference of the air chamber, delivering aroma to the user's nose.

The aerosol generating article can be understood as a discardable, single use consumable to be used with an electrically heated aerosol and flavor generating device or smoking system that generates aerosol from the aerosol generating article. The aerosol generating article may comprise a mouth end configured to be inserted into a user's mouth. An opposite end of the aerosol generating article may be configured to be inserted into the heated aerosol and flavor generating device that generates aerosol from the aerosol generating article. The aerosol generating article may comprise a mouthpiece and an aerosol forming substrate wrapped in at least a tipping paper. The mouthpiece can be understood to be configured to be inserted into a user's mouth.

The flavor generating article can be understood to comprise sensorial media or flavored material configured to volatilize naturally by contact with air. The flavor generating article may be provided as a capsule, a cartridge or a porous element shaped in disc or donut format containing the sensorial media. The shape of the flavor generating article may have an influence on the air flow inside the module. The flavor generating article may comprise a solid substrate structure configured to adsorb a liquid sensorial media. The solid substrate structure may comprise at least one of paper, cellulose acetate, expanded foam, or a wire mesh. The flavor generating article may comprise a solid porous substrate configured to release at least one sensorial media.

The provision of a solid porous substrate may increase the surface area of the flavor generating article. As set out above, a larger surface area of the flavor generating article may advantageously increase the concentration of sensorial media entrained in the air passing through the air chamber.

The volatilized sensorial media can be understood to be aroma as perceived as so in sensorial way by the user when inhaled via the nose. The volatilized sensorial media can be understood to be flavor as perceived as so in sensorial way by the user when inhaled via the mouth.

The volatilized sensorial media may be mixed with and carried in an airflow. The airflow flows from a distal position or end to a proximal position or end, with the proximal position being the mouthpiece of the aerosol generating device. The distal position may be the replaceable module.

The module can be understood as a replaceable accessory for an aerosol and flavor generating device, which can be inserted or removed at any time from the aerosol generating device so that a user can enjoy use of an aerosol generating device with or without the module in place, or with or without the addition of sensorial media in the module. The replaceable module may further comprise a flavor generating article.

The air chamber can be understood to be a cavity inside the module, accommodating the flavor generating article.

The air inlet can be understood as at least an aperture on a distal end of the air chamber providing an entrance for external air into the air chamber.

The air outlet can be understood as at least a passage or channel providing an exit for an airflow inside the air chamber towards the aerosol generating article. The air outlet may be on a proximal end of the air chamber, the proximal end being opposite to the distal end.

The opening(s) can be understood as aperture(s) in the circumference of the air chamber allowing for fluid flow from the air chamber to the exterior of the module, at a location that is distal to the air outlet. The opening(s) may radially extend from the air chamber.

The holding unit can be understood as a device for holding the flavor generating article inside the air chamber. The holding unit may allow an easy change of the flavor generating article. The holding unit may be configured such that the airflow inside the air chamber can flow around the flavor generating article from all sides.

In an embodiment, the air chamber comprises a turbulence-generating unit arranged between the air inlet and the opening to block the airflow at least partially to cause a turbulent airflow in the air chamber. This can be understood in that the turbulence-generating unit blocks the main axial airflow and urges the airflow to pass upstream and downstream of the turbulence-generating unit creating the turbulent airflow in close radial proximity of the opening(s). As a result, a small part of the airflow exits the air chamber through the opening(s) while the main stream of the airflow exits the air chamber through the air outlet towards the aerosol generating article. In other words, the airflow can be divided into a first portion and a second portion. The first portion corresponds to the main stream of the airflow being configured to be provided to the mouth of the user and the second portion corresponds to the small part of the airflow being configured to be provided to the nose of the user. Therefore, the present module allows a very good performance in view of aromatic notes and flavoring aspects. The turbulence-generating unit may be a transverse blocker, such as a plate.

In an embodiment, the holding unit comprises a distal grid element and a proximal grid element for holding the flavor generating article between the distal grid element and the proximal grid element. The distal grid element may hold a base of the flavor generating article and the proximal grid element may hold the top of the flavor generating article. This can be understood in that the flavor generating article is at least partially free of holding elements. As a result, the airflow inside the air chamber passes the flavor generating device feeding the natural volatilization of the sensorial media. Furthermore, the holding unit may allow an easy replacement of the flavor generating article. As a result, the flavor generating article may be quickly changed by the user for different aroma, at any time, to use with the same type aerosol generating articles or different types of aerosol generating articles. In other words, the user may combine a selection of aromas, aromas and flavors as desired, allowing an individual mixing in a unique and customized way for choosing the most pleasant combination for an aromatic experience according to her/his taste.

In an embodiment, the turbulence-generating unit is less penetrable for the airflow than the proximal grid element. The turbulence-generating unit obstructs the airflow between the air inlet and the air outlet or opening. This can be understood in that, for the airflow coming from the air inlet, the turbulence-generating unit is a greater flow-resistance than the proximal grid. In other words, the airflow can pass through the grid element easier than through the turbulence-generating unit. As a result, the airflow coming from the air inlet impinges the turbulence-generating unit, is deflected by the turbulence-generating unit resulting in a turbulent airflow mainly passing through the proximal grid element.

In an embodiment, the at least one opening is a nasal airflow passage configured to be accessible to a nose of the user. The nasal airflow passage can be understood as aperture in the outer surface of the air chamber that allow for fluid flow from the air chamber to the exterior of the module, at a location that in close proximity of a user's nose. This can be understood in that the nasal airflow passage is arranged distal to the air outlet, which is configured to be connected to an aerosol generating article. As a result, an airflow cannot only be configured to be provided by the mouthpiece of the aerosol generating article to the mouth of the user, but also by the nasal airflow passage to the nose of the user. As the airflow is accessible to, or delivered to, the nose of a user, in addition to the mouth of a user, the user is able to smell the aroma, as well as taste the flavor mixed in the airflow.

In an embodiment, the at least one opening has a diameter from 0.007 mm to 0.09 mm. The at least one opening may have a diameter from 0.009 mm to 0.07 mm. The at least one opening may have a diameter from 0.01 mm to 0.05 mm. In other words, the at least one opening is big enough for the second portion of the airflow to exit the module and small enough such that no contamination can enter the module through the at least one opening.

In an embodiment, the air chamber comprises a plurality of openings. The plurality of openings can be understood as more than one, preferably several openings. The plurality of openings may comprise 7 to 37 openings. The plurality of openings can be arranged in an ordered group. The plurality of openings can be distributed along a circumference of the air chamber. The plurality of openings can be arranged in shape of at least a ring surrounding the circumference of the air chamber. The plurality of opening can be arranged in shape of a spiral surrounding the circumference of the air chamber. A distance between adjacent openings can be continuous or discontinuous. Each opening may have a circular form or cross section, but also other shapes are possible. The openings may have the same or different forms and sizes. The plurality of openings may be a plurality of nasal flow passages.

In an embodiment, the air chamber comprises a shutter skirt, which is moveable relative to the at least one opening to close the at least one opening. In other words, the shutter skirt prevents that the second part of the airflow exits through the opening(s) and thereby stops or interrupts the aroma release through the opening(s). This may allow storing the module/aerosol and flavoring generating device into a pocket when the module/device is not in use. This may also allow saving at least a part of the flavor generating device making it last longer.

In an embodiment, the replaceable module further comprises at least a module base and a thereto attachable module cover, which together form a module housing. This can be understood in that the module base is removable from the module cover. This may allow the user to easily and quickly change the flavor generating article.

In an embodiment, the replaceable module further comprises an inner member. The inner member may be rotatable relative to the nasal airflow passages to selectively block one or more of the plurality of nasal airflow passages. The inner member may be arranged within the air chamber. In other words, the opening(s) may be blocked by the inner member from inside the air chamber. This arrangement may lead to a compact device.

In another embodiment, the inner member may be arranged outside the air chamber and the module housing. In other words, the opening(s) may be blocked by the inner member from outside the module. This arrangement may lead to a device, which is easy to repair and interesting to look at.

In an embodiment, the inner member is rotatable by means of gravity so that the inner member covers at least one of the openings at a lower part of the module and leaves open at least one other of the openings at an upper part of the module, which is closer to the user's nose when the device is in use.

This can be understood in that the inner member may be rotatable relative to the module and the openings by means of gravity so that the inner member covers at least one of the openings at a lower part of the module and leaves open at least one other of the openings at an upper part of the module. The left open opening(s) at the upper part of the module may then be configured to have the open opening(s)

accessible to the nose of the user. In other words, the moveable inner member may block at least one opening and leave open the other openings. Further, because the moveable inner member moves by means of gravity, it may leave an opening on an upper part of the air chamber, which is thereby configured to be accessible to the nose of the user automatically.

This may allow reducing the portion of the flavored airflow assigned to the nose of the user and maintaining the portion of the flavored airflow assigned to the mouth at a maximum. In other words, no flow of aroma or flavor may be "wasted" to openings which are on the opposite side of the nose of the user and therefore not accessible to the nose. Furthermore, the moveable inner member may allow this function independent of a holding orientation of the module by the user, because the inner member selectively blocks the opening that is on the opposite side of the module from the nose of the user by means of gravity, automatically rotated into the correct position.

In an embodiment, the inner member may be arranged in a radial groove relative to the module. The radial groove may be arranged inside or outside the module and the air chamber. The radial groove may allow a good guidance of the moveable inner member relative to the module.

In an embodiment, the inner member may be arranged in a rail relative to the module. The rail may be arranged inside or outside the module and the air chamber. The rail may be arranged in the groove or directly at the module. The rail may allow a further improved guidance of the moveable inner member relative to the module housing.

In an embodiment, the inner member may be formed as an interrupted ring comprising a ring body and an at least partial interruption of the ring body. This may lead to the fact that the interrupted ring is lighter at the position of the interruption than at the position of the ring body, which means the inner member in form of the interrupted ring may automatically rotate by means of gravity relative to the module into a position in which the interruption is on the top side of the aerosol and flavor generating device, accessible to the nose of a user. The interruption may further allow opening at least one of the openings on the upper part of the module, which is accessible for the nose. The ring body may block other opening(s). As a result, no flow of aroma may be "wasted" to opening(s), which is/are not accessible for the nose regardless of a holding orientation of the aerosol and flavor generating device by the user.

In another embodiment, the inner member may comprise two leg portions and a center portion. The center portion may be arranged between the two leg portions. The center portion may be configured to be heavier than each leg portion so that the center portion is moveable to a lower part of the module by means of gravity. Different materials of the components, different thicknesses, massive and hollow constructions and/or the like may implement the difference in weight. The difference in weight between the leg portions and the center portion may lead to the fact that the inner member may automatically rotate by means of gravity relative to the module into a position in which the center portion is in a downward direction. The center portion may allow blocking at least one of the openings on the lower part of the module, which is remote from the nose. The leg portions or parts of it or an interruption between the leg portions may open another opening(s). As a result, the flow of aroma is limited to opening(s), which is/are accessible for the nose and this works independent of a holding orientation of the aerosol and flavor generating device by the user.

In an embodiment, the replaceable module may further comprise at least one electrical contact arranged at a surface of the replaceable module. The inner member may comprise an electrically conductive portion to close an electric circuit when the rotatable inner member is at a position where the electrically conductive portion contacts an electrical contact provided on the module. For example, the electric conductive portion may be provided in the center portion of the inner member.

In an embodiment, the rotatable inner member is at a position where the electrically conductive portion contacts an electrical contact provided at the surface of the module.

In an embodiment, the replaceable module may comprise at least one illumination unit, which is configured to be supplied with electric energy when the electric circuit is closed. The illumination unit may be an LED, a screen, or the like. The illumination unit may provide light that is sensed by the user. In embodiments, the light may enhance the overall experience of the user. For example, if the aromatic notes and flavoring aspects are cooling, for example mint or menthol or *eucalyptus* flavor, the light may be a cool light, such as a blue light. This illumination may serve to enhance the user's perception of cooling aromatic notes and flavoring aspects of the taste and smell of the aerosol. In another example, if the aromatic notes and flavoring aspects are citrus, the light may be a yellow or orange light. This light may enhance the user's taste and smell perception of citrus aromatic notes and flavoring aspects. The illumination may be set by the user, or may be set according to the aromatic notes and flavoring aspects of the aerosol.

In additional embodiments, the illumination unit may be configured to signal an operational condition of the aerosol and flavor generating device, on orientation of the aerosol and flavor generating device relative to the ground and/or relative to a user, a taste of the aerosol or sensorial media, battery life, puff count, remaining sensorial media volume, time, remaining time, malfunction of the aerosol and flavor generating device, status of the device, a temperature of the aerosol and/or the like. In an embodiment, the illumination unit may be supplied with electric energy and thereby switched on depending on and in response to a position of the moveable inner member. Consequently, the illumination unit may be switched on depending on and in response to a position of the module or the aerosol and flavor generating device relative to the ground. This may be used to signal an e.g. preferred holding position to the user.

In an embodiment, there may be more than one illumination unit and either more than one electrical contact at the module or more than one electrically conductive portion at the rotatable inner member. As a result, an electric circuit between an electrical contact of the module and an electrically conductive portion of the rotatable inner member can be closed in more than one position. This may lead to the effect that selectively one of the more than one illumination units may be supplied with electric energy and thereby switched on depending on and in response to a position of the moveable inner member. This may be used for enlighten the illumination unit(s) facing the eyes of the user, while leaving other(s) dark to save energy.

In an embodiment, the illumination unit may be arranged at the moveable inner member. The illumination unit may be arranged at a front face of the inner member directed towards the mouthpiece. The illumination unit may be arranged at the ring body of the inner member adjacent to the interruption. The illumination unit may be arranged at one of the leg portions of the inner member adjacent to a free end of the leg portion.

Alternatively or additionally to the electrical contact at the module and electrically conductive portion at the inner member implementation above, the illumination of the illumination unit (a first illumination unit) may be controllable by a control unit of the aerosol and flavor generating device based on the position data of the inner member.

In an embodiment, the replaceable module may comprise at least another illumination unit (a second illumination unit). An illumination of the one of the two illumination units, which is more remote from a ground floor than the other may be controllable by the control unit based on the position data of the inner member. This means in case of more than one illumination unit, this may be used to enlighten only predefined illumination unit(s), as for example, the one(s) facing the eyes of the user, while leaving other(s) dark to save energy. The position data of the inner member may be provided by a gyroscope sensor, which is configured to be included in the aerosol and flavor generating device.

In an embodiment, the color of an illumination may be selectable by a user.

In an embodiment, the replaceable module may comprise a color unit configured to control a color of an illumination. This can be additionally or alternatively to the selection by the user mentioned above. The control of the color of illumination can be based on, for example, a type of aerosol generating substrate of the flavor generating article used in the module or aerosol and flavor generating device.

In an embodiment, the replaceable module may comprise a rotor element. The rotor element may be arranged within the air chamber. The rotor element may be rotatable relative to the module. The rotor element may be configured to transport a part of the flow of aroma or flavor radially in the direction of the opening(s). This can be done in that rotor blades of the rotor element and/or outer portions of the rotor blades are formed or designed to transport a part of the flow of aroma radially in the direction of the opening(s). The transport of aromatic or flavored flow to the opening(s) may therefore be more effective.

The rotor element may be arranged on a rotor shaft extending along a longitudinal direction of the air chamber. The rotor shaft may extend along a central axis of the air chamber.

The rotor element may be configured to be rotated by means of a puff of a user. This is very energy efficient, because it does not require an additional energy supply for e.g. a motor.

The rotor element may also be configured to be rotated by means of a motor. The motor may be an electric motor or the like. The motor may enable a stronger flow of aerosol.

According to another aspect of the present disclosure, there is provided a heating system for the aerosol and flavor generating device. The heating system comprises a replaceable module and a heating unit for heating an aerosol generating article. The replaceable module is reversibly connectable to the heating unit. An air outlet of the replaceable module is configured to be connected to the aerosol generating article. This can be understood in that the module releases a flavored airflow through the air outlet towards the heating unit and the aerosol generating article. The heating unit is configured provide an aerosol generation area, in which the aerosol forming substrate of the aerosol generating article is heated, thereby generating aerosol. The generated aerosol mixes with the flavored air providing additional fresh flavor inside the aerosol generating area. The heating unit may be reversibly connectable to a power unit (e.g. a battery pack).

In an embodiment, the heating unit comprises an induction-heating element to be inserted into the aerosol generating article. This can be understood in that the aerosol generating article incorporates a susceptor in its interior. The heating system further comprises an inductor coil configured to receive the aerosol generating device at least partially. As a result, the aerosol generation area may be based on the aerosol generating article and heat generated by induction via the susceptor inside the aerosol generating article. This arrangement may lead to a compact device. The induction-heating element may be in a shape of a flat thin metallic element arranged in the center of the inductor coil configured to surround the aerosol generating article.

In another embodiment, the heating unit comprises a peripheral heating socket configured to surround the aerosol generating article at least partially. In other words, the peripheral heating socket may be a generic heating engine using external resistive heating or external induction heating. This arrangement may lead to a device, which is easy to repair.

According to another aspect of the present disclosure, there is provided an aerosol and flavor generating device. The aerosol and flavor generating device comprises a heating system as described above and a power system. The heating system as described above comprises the replaceable module and the heating unit. The power system is configured to provide energy to the heating system. The replaceable module is reversibly insertable between the power system and the heating system.

The aerosol and flavor generating device comprising the replaceable module as described above allows a better performance in view of aromatic notes and flavoring aspects compared to conventional electrically heated smoking systems. Examples of aromatic notes and flavoring aspects or sensorial media that might be provided by the flavor generating article include, for example, at least one of rose, mint, menthol, chocolate, vanilla, floral, herbal, or spice flavorings. The aromatic notes and flavoring aspects are improved, because not only a flow of aerosol is provided by a mouthpiece at a mouth end of the aerosol generating article, delivering aerosol to the user's mouth, but a flow of aerosol mixed with flavor from the flavor generating article may be provided. Additionally, a flow of aroma from the flavor generating article may be provided by the opening(s) arranged at a circumference of the air chamber, delivering aroma to the user's nose.

An airflow through the aerosol and flavor generating device can be understood as follows: The aerosol generating article may be partially inserted into a reception portion of the aerosol and flavor generating device. Air may be drawn into the aerosol and flavor generating device by an action of a user drawing on a mouthpiece of the aerosol generating article. The air may be in particular drawn into the aerosol and flavor generating device through at least an air inlet. The air inlet may be in fluid communication with an air chamber inside the module. As a result, the air drawn into the aerosol and flavor generating device may pass through the air chamber and may mix with the volatilized sensorial media of flavor generating article. The drawn and flavored air may then enter an aerosol forming substrate at a distal end of the aerosol generating article. The drawn flavored air may proceed through the aerosol forming substrate, which may be heated to generate the aerosol, and then to the mouthpiece of the aerosol generating article and back to the user.

According to another aspect of the present disclosure, also a method of providing an airflow through a replaceable module for an aerosol and flavor generating device is presented. The method of providing an airflow through a replaceable module comprises the following steps, not necessarily in this order:
provide a replaceable module as described above,
supplying a first portion of an airflow through an aerosol generating article connected to an air outlet of the replaceable module, and/or
supplying a second portion of the airflow through a flavor generating article held by the replaceable module and through at least one opening of the replaceable module.

The aromatic notes and flavoring aspects are improved, because not only not only a flow of pure aerosol is provided by a mouthpiece at a mouth end of the aerosol generating article, delivering aerosol to the user's mouth, but a flow of aerosol mixed with flavor from the flavor generating article. Additionally, a flow of aroma from the flavor generating article is provided by the opening(s) arranged at a circumference of the air chamber, delivering aroma to the user's nose.

In an embodiment, during puffing by a user, the first portion of the airflow is accessible to a mouth of the user and the second portion of the airflow is accessible to a nose of the user. During drawing or puffing by a user, air is actively drawn through the air inlets into the air chamber of the module. Inside the air chamber, the air mixes with the volatilized sensorial media from the flavor generating article. A turbulent flavored airflow is created that causes a second portion of the airflow to be discharged through the opening(s), while the first portion larger than the second portion of the airflow passes through the air outlet of the air chamber into the aerosol generating article to feed aerosolization. During puffing, there is the highest level of natural volatilization of the sensorial media of the flavor generating article (high volume release). This arrangement allows effectively providing additional and fresh flavor ingredient inside an aerosolization area of the aerosol generating article. This arrangement may lead to a device capable of dynamically providing flavor dependent on the user's puffing strength. In other words, the stronger the puff the more flavor is, preferably proportionally, released towards the first portion of the airflow flowing into the aerosol generating article.

In an embodiment, without puffing by a user, only a part of the second portion of the airflow is provided and accessible to the nose by means of diffusion from the flavor generating article to the nose. Without puffing, there is no forced airflow towards the mouthpiece of the aerosol generating article as when during puffing. Due to the fact the sensorial media of the flavor generating article volatilizes naturally, there may exist an aroma release even without a forced airflow that is of lower volume than during puffing. Between puffs, due to non-existing airflow toward the aerosol generating article, a significant amount of flavored air may stay in the air chamber of the module, being then naturally released via the circumferential opening(s). Thus, between puffs, there exists a medium volume release of aroma. Even before consumption, the natural volatilization of the sensorial media may occur due to natural airflow via the opening(s) in the module such that a low volume release of aroma may occur. As the user may be very sensitive to nasal aroma in such close proximity of the nose, the aroma may be immediately sensed and inhaled via the nose, even when just manipulating the device around the mouth/nose area. Additionally, there may be provided a no-release state, in which the opening(s) are fully closed, e.g. by sliding a shutter skirt or shutting ring over the openings such that no aroma is allowed to exit the module through the opening(s). Such state may be useful to when the device is not in use, e.g. stored in a pocket, or to disable the continuous natural volatilization of the sensorial media for saving it and lasting longer.

Below, there is provided a non-exhaustive list of non-limiting examples. Any one or more of the features of these examples may be combined with any one or more features of another example, embodiment, or aspect described herein.

A. A replaceable module for an aerosol and flavor generating device,
wherein the replaceable module comprises an air chamber,
wherein the air chamber comprises at least an air inlet for an entrance of an airflow into the air chamber,
wherein the air chamber comprises an air outlet for an exit of a first portion of the airflow out of the air chamber, wherein the air outlet is configured to be connected to an aerosol generating article to direct the first portion of the airflow through the aerosol generating article,
wherein the air chamber comprises at least an opening arranged at a circumference of the air chamber for an exit of a second portion of the airflow radially out of the air chamber, and
wherein the air chamber comprises a holding unit for holding a flavor generating article between the air inlet and the opening.

B. Replaceable module according to claim A, wherein the air chamber comprises a turbulence-generating unit arranged between the air inlet and the opening to block the airflow at least partially to cause a turbulent airflow in the air chamber.

C. Replaceable module according to one of the preceding claims, wherein the holding unit comprises a distal grid element and a proximal grid element for holding the flavor generating article between the distal grid element and the proximal grid element.

D. Replaceable module according to claims B and C, wherein the turbulence-generating unit is less penetrable for the airflow than the proximal grid element.

E. Replaceable module according to one of the preceding claims, wherein the at least one opening is a nasal airflow passage configured to be accessible to a nose of the user.

F. Replaceable module according to one of the preceding claims, wherein the at least one opening has a diameter from 0.007 mm to 0.09 mm.

G. Replaceable module according to one of the preceding claims, wherein the air chamber comprises a plurality of openings.

H. Replaceable module according to one of the preceding claims, wherein the air chamber comprises a shutter skirt, which is moveable relative to the at least one opening to close the at least one opening.

I. Replaceable module according to one of the preceding claims, further comprising at least a module base and a thereto attachable module cover, which together form a module housing.

J. Replaceable module according to one of the preceding claims, further comprising an inner member arranged within the air chamber, wherein the inner member is rotatable relative to the nasal airflow passages to selectively block one or more of the plurality of nasal airflow passages.

K. Replaceable module according to the preceding claim, wherein the inner member is rotatable by means of gravity so that the inner member covers at least one of the nasal airflow passages at a lower part of the module and leaves open at least one other of the nasal airflow passages at an upper part of the module.

L. Replaceable module according to claim J or K, wherein the inner member is formed as an interrupted ring comprising a ring body and an at least partial interruption of the ring body.

M. Replaceable module according to claim J or K, wherein the inner member comprises two leg portions and a center portion, wherein the center portion is arranged between the two leg portions, and wherein the center portion is heavier than each leg portion so that the center portion is moveable to a lower part of the mouthpiece body by means of gravity.

N. Replaceable module according to one of the claims J to M, further comprising at least one electrical contact arranged at a surface of the replaceable module.

O. Replaceable module according to the preceding claim, wherein the inner member comprises an electrically conductive portion to close an electric circuit when the rotatable inner member is at a position where the electrically conductive portion contacts an electrical contact provided at the surface of the module.

P. Replaceable module according to one of the preceding claims, further comprising at least one illumination unit, which is configured to be supplied with electric energy when the electric circuit is closed.

Q. Replaceable module according to one of the preceding claims, further comprising a rotor element, which is arranged within the air chamber and which is rotatable relative to the module.

R. Replaceable module according to one of the preceding claims, further comprising a heater.

S. Replaceable module according to one of the preceding claims, further comprising a flavor generating article.

T. A heating system for aerosol and flavor generating device, comprising a replaceable module according to one of the preceding claims and a heating unit for heating an aerosol generating article, wherein the replaceable module is reversibly connectable to the heating unit, and wherein an air outlet of the replaceable module is configured to be connected to the aerosol generating article.

U. Heating system according to the preceding claim, wherein the heating unit comprises an induction-heating element to be inserted into the aerosol generating article.

V. Heating system according to claim T, wherein the heating unit comprises a peripheral heating socket configured to surround the aerosol generating article at least partially.

W. An aerosol and flavor generating device, comprising a heating system according to one of the claims T to V and a power system, wherein the power system is configured to provide energy to the heating system, and wherein the replaceable module is reversibly insertable between the power system and the heating system.

X. A method of providing an airflow through a replaceable module for an aerosol and flavor generating device, comprising:
providing a replaceable module according to one of the claims A to S,
supplying a first portion of an airflow through an aerosol generating article connected to an air outlet of the replaceable module, and/or
supplying a second portion of the airflow through a flavor generating article held by the replaceable module and through at least one opening of the replaceable module.

Y. Method according to the preceding claim, wherein, during puffing by a user, the first portion of the airflow is accessible to a mouth of the user and the second portion of the airflow is accessible to a nose of the user.

Z. Method according to claim X or Y, wherein, without puffing by a user, only a part of the second portion of the airflow is provided and accessible to the nose by means of diffusion from the flavor generating article to the nose.

Examples will now be further described with reference to the figures in which.

Figure 1:
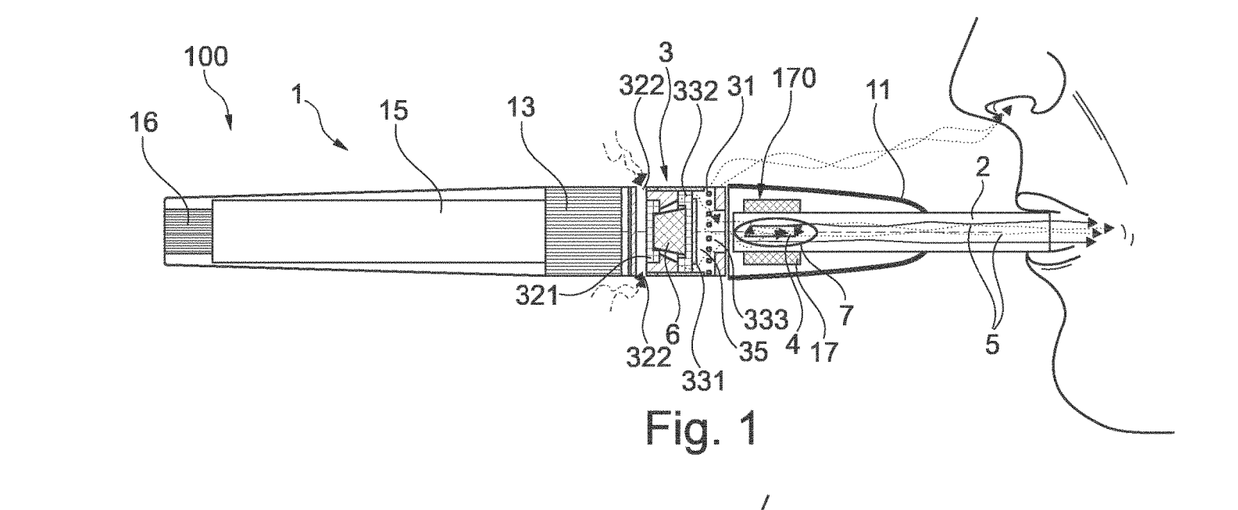
FIG. 1 is a schematic and exemplary cross-section of an embodiment of an aerosol and flavor generating device according to the present disclosure and a replaceable module with a flavor generating article according to the present disclosure.

FIG. 1 shows an aerosol and flavor generating device 1 according to the present disclosure. The aerosol and flavor generating device 1 comprises a power system 100, a heating unit 170 and a replaceable flavor module 3.

The power system 100 comprises a power source 15, a control unit 13 and a power charging connection port 16. The power system 100 and thereby the control unit 13 and the power source 15 are reversibly connectable to the module 3 and thereby to the heating unit 170. The power source 15 comprises at least one battery and is configured to provide energy to the heating unit 170.

The heating unit 170 comprises a holder 11, an inductor coil element 17 arranged inside the holder 11 and an induction-heating element 4, such as a susceptor, in an aerosol generating article 2. The holder 11 is configured to receive the aerosol generating article 2 having a mouthpiece to be inserted into a user's mouth. The module 3 is reversibly connected to the holder 11 such that the air outlet 333 is fluidly connected to the aerosol generating article 2. The aerosol generating article 2 is configured to be inserted into the holder 11 such that the induction-heating element 4 is arranged in the center of the inductor coil element 17.

The heating unit 170 is configured to heat the aerosol generating article 2, particularly an aerosol forming substrate of the aerosol generating article 2, in the overlapping area of the heating unit 170 and the aerosol generating article 2, thus creating an aerosol generation area 7. The heating unit 170 of this embodiment generates heat by induction via the inductor coil element 17 and the induction-heating element 4 inside the aerosol generating article 2.

Figure 2:
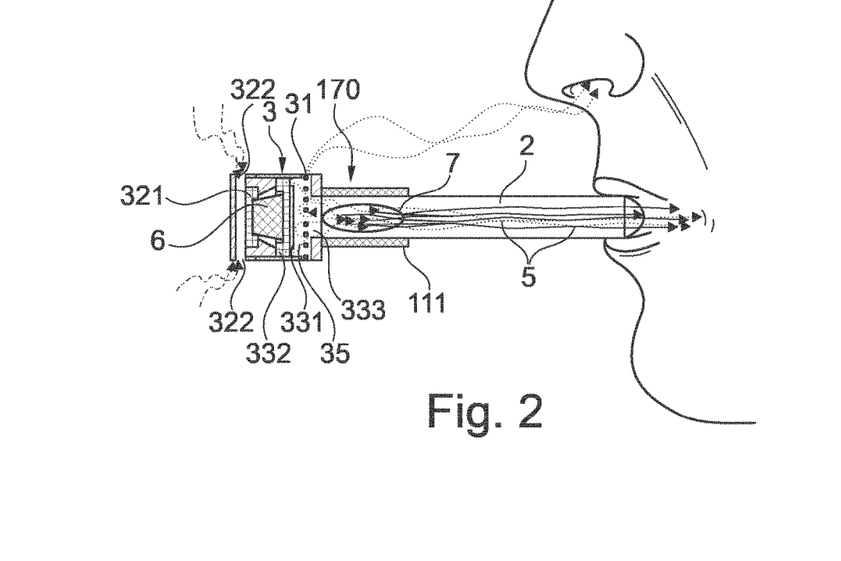
FIG. 2 is a schematic and exemplary partial cross-section of an embodiment of an aerosol and flavor generating device according to the present disclosure and a replaceable module with a flavor generating article.

FIG. 2 shows another embodiment of the aerosol and flavor generating device 1 according to the present disclosure. The aerosol and flavor generating device 1 according to this embodiment does not comprise a holder, but an external heating unit comprising a peripheral heat socket 111 that also functions as a holder for the aerosol generating article 2. The replaceable module 3 is reversibly connected to the peripheral heat socket 111 such that the air outlet 333 is at least fluidly connected to the aerosol generating article 2. The peripheral heat socket 111 surrounds the aerosol generating article 2 at least partially. In use, the peripheral heat socket 111 heats the aerosol forming substrate, for example by resistive heating of the aerosol generating article 2 from outside the aerosol generating article 2. It is to be noted that the aerosol and flavor generating device 1 according to this embodiment also comprises a power system, which is not shown.

The replaceable module 3 of FIGS. 1 and 2 comprises an air chamber 35 having two air inlets 322 and an air outlet 333. Each air inlet 322 provides an entrance of an airflow into the air chamber 35 and the air outlet 333 provides an exit of an airflow towards an aerosol generating article 2. The air chamber 35 further comprises a distal grid element 321, a proximal grid element 332, a turbulence-generating unit 331 and openings 31. The distal grid element 321 is arranged upstream of the proximal grid element 332 with regard to the airflow flowing through the module 3. The grid elements 321, 332 form a holding unit for holding a flavor generating article 6 between the distal grid element 321 and the proximal grid element 332. The openings 31 are arranged at the circumference of the air chamber 35 between the proximal grid element 332 and the air outlet 333. The turbulence-generating unit 331 is arranged between the grid element 332 and the openings 31.

The turbulence-generating unit 331 is configured to block the airflow in the air chamber 35 totally or at least partially thereby creating a turbulent airflow inside the air chamber 35, preferably close to the openings 31. The turbulent airflow allows dividing the airflow into a first portion and a second portion. The first portion corresponds to the main part of the airflow and flows through the air outlet 333 towards the aerosol generating article 2. The second portion corresponds to a small part of the airflow radially exiting the air chamber 35 through the openings 31. The openings 31 are configured as nasal airflow passages providing access to a nose of a user.

In use, the airflow through of the aerosol and flavor generating device 1 is driven by the natural breathing and by the puff of a user. The airflow entering the air chamber 35 through the air inlets 322 gets mixed with aroma created via volatilization of sensorial media of the flavor generating article 6. The first portion of the airflow flows through the air outlet 333 towards the aerosol generating article 2. In the aerosol generating article 2 the flavored airflow mixes with aerosol created via heating the aerosol forming substrate of the aerosol generating article 2. Thus, the combined airflow 5 being inhaled by the user via the mouth comprises a mix of the flavor of the flavor generating article 6 and the aerosol of the aerosol generating article 2. The second portion of the airflow in the air chamber 35 radially exits the air chamber 35 through the openings 31, which are arranged in close proximity, preferably under, the nose of the user. Thus, the second airflow mixed with aroma of the flavor generating article 6 can be inhaled via the user's nose.

In other words, in an embodiment, the module 3 is configured to adaptively and dynamically release aroma/flavor generated via volatilization of sensorial media of the flavor generating article 6 dependent on the natural breathing of the user, allowing several different modes of intensity of the released aroma/flavor. A state before consumption corresponds to a low volume release as the release of aroma of the flavor generating article 6 occurs by natural, not forced, airflow exiting the air chamber 35 through the openings 31. As humans are usually very sensitive to nasal aroma, particularly in close proximity of the nose, the aroma contained in the airflow is inhaled by the user via the nose, even when the aerosol and flavor generating device 1 is just manipulated around the mouth/nose area, which commonly happens during use of the device.

During consumption, particularly during puffing, there is a high volume release driven by a forced airflow entering the air chamber 35 through the air inlets 322. Due to the arrangement inside the module 3, as described with regard to FIGS. 1a to 1c, a turbulent airflow is created inside the air chamber 35. The turbulent airflow causes that the airflow partially exits the air chamber 35 through the openings 31 while the main part of the airflow exits the air chamber 35 through the air outlet 333 towards the aerosol generating article 2. Between puffs, there is a medium volume release similar to the low volume release before consumption. However, the aroma being released by natural volatilization of the sensorial media occurs at greater extend as the volume of air inside the air chamber is higher than before consumption. Due to the fact that there is no airflow towards the aerosol generating article 2, the airflow substantially stays in the air chamber 35, being then naturally released via the openings 31. During puffing, there is an increased volume airflow through the air chamber 35 and therefore, an increased level of volatilization of the sensorial media of the flavor generating article 6. Thus, the second portion of the airflow flowing out via the openings 31 is of higher volume during puffs causing a recognizable change of the aroma intensity inhaled via the nose.

Additionally, there may be a no-release mode. In such mode, as if desired, the openings 31 can be fully closed by sliding the shutter skirt 34 over the openings 31. This mode is preferably used when the aerosol and flavor generating device 1 is not in use, e.g. stored inside a pocket. However, this mode may also be useful to disable the continuous natural volatilization of the sensorial media during consumption for saving it and lasting longer.

Figure 3A:
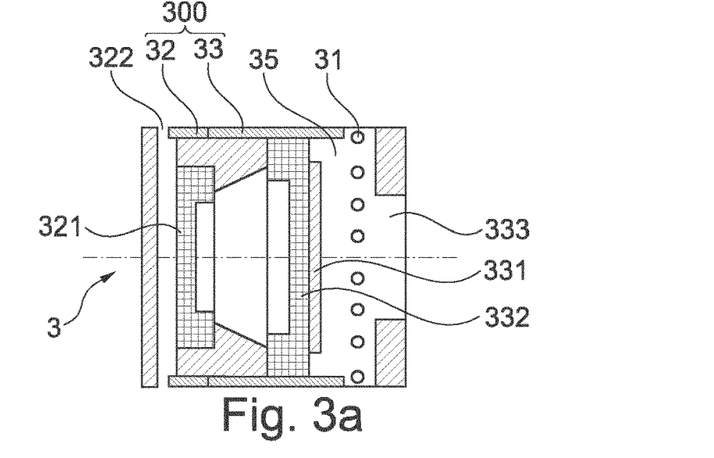
FIG. 3a is a schematic and exemplary cross-section of an embodiment of a replaceable module according to the present disclosure without a flavor generating article.
Figure 3B:
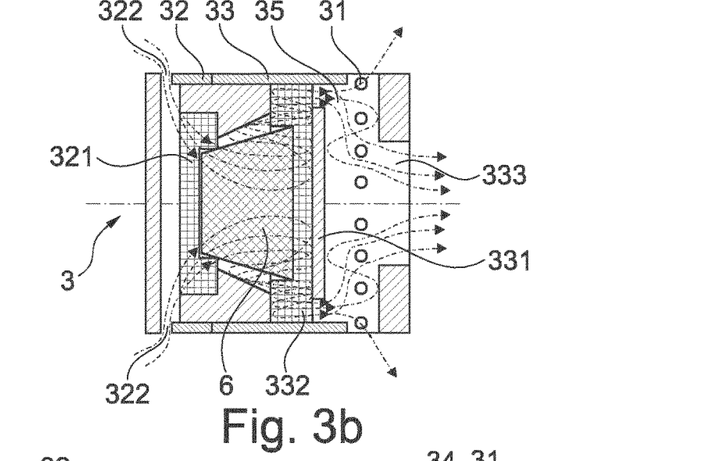
FIG. 3b is a schematic and exemplary cross-section of an embodiment of a replaceable module according to the present disclosure with a flavor generating article.
Figure 3C:
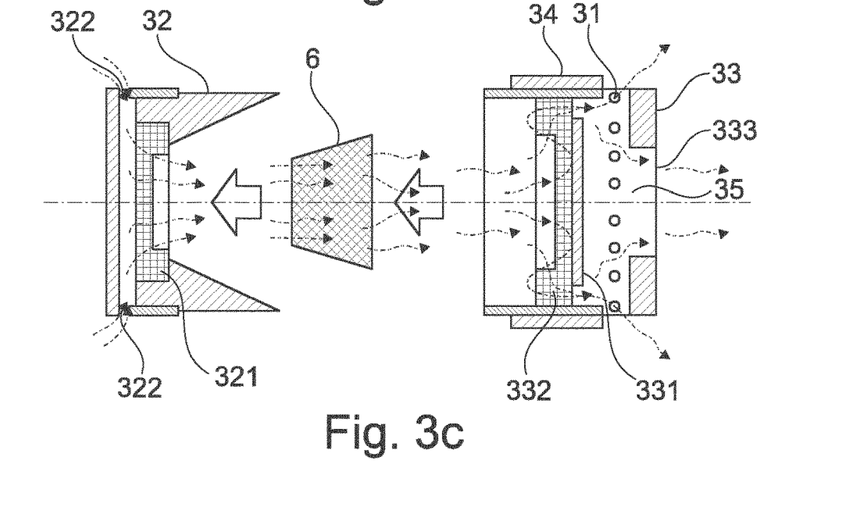
FIG. 3c is a schematic and exemplary exploded view of an embodiment of a replaceable module with a flavor generating article.

FIGS. 3a, 3b and 3c show the replaceable module 3 according to an embodiment of the present disclosure. FIG. 3a shows the replaceable module 3 without the flavor generating article 6. FIG. 3b shows the replaceable module 3 with the flavor generating article 6 inserted in the replaceable module 3. FIG. 3c shows an exploded view of the replaceable module 3 with the flavor generating article 6. The replaceable module 3 comprises the air chamber 35 having two air inlets 322 and the air outlet 333. Each air inlet 322 provides an entrance of an airflow into the air chamber 35 and the air outlet 333 provides an exit of an airflow towards the aerosol generating article 2 (see FIGS. 1 and 2). The air chamber 35 further comprises the distal grid element 321, the proximal grid element 332, the turbulence-generating unit 331 and openings 31. In FIG. 3b, the grid elements 321, 332 hold the flavor generating article 6. The openings 31 are arranged at the circumference of the air chamber 35 between the grid element 332 and the air outlet 333. The turbulence-generating unit 331 is arranged between the grid element 332 and the openings 31.

The turbulence-generating unit 331 is a flow-obstructing element, such as a plate, a disc or a washer. The turbulence-generating unit 331 may be solid or at least less porous than the grid element 332 and causes a total or at least partial blockage of the airflow in the air chamber 35 thereby creating a turbulent airflow inside the air chamber 35, preferably close to the openings 31. The turbulent airflow allows dividing the airflow into a first portion and a second portion. The first portion corresponds to the main part of the airflow and flows through the air outlet 333 towards the aerosol generating article 2. The second portion corresponds to a small part of the airflow radially exiting the air chamber 35 through the openings 31. Several openings 31 are shown, but any number of openings may be provided, preferably 7 to 37 openings 31. The openings 31 are configured as nasal airflow passages providing access to a nose of a user. The openings 31 may have a diameter from 0.007 mm to 0.09 mm, preferably from 0.009 mm to 0.07 mm, most preferably from 0.01 mm to 0.05 mm.

The replaceable module 3 according to an embodiment of the present disclosure comprises a module base 32 and a module cover 33, The module cover 33 is reversibly connectable to the module base 32, together forming a module housing 300 of the replaceable module 3. Because the module cover 33 can be removed from the module base 32, and because the replaceable module 3 can be removed from the aerosol and flavor generating device 1, the replaceable module 3 allows easy access to and easy change of the flavor generating article 6.

In FIG. 1c, there is additionally provided a shutter skirt 34 arranged at an outer surface of the module 3. The shutter skirt 34 is at least axially moveable relative to the openings 31 to close the openings 31 and thus, preventing flavored air from exiting the air chamber 35 through the closed openings 31.

Figures 4A, 4B, 4C:
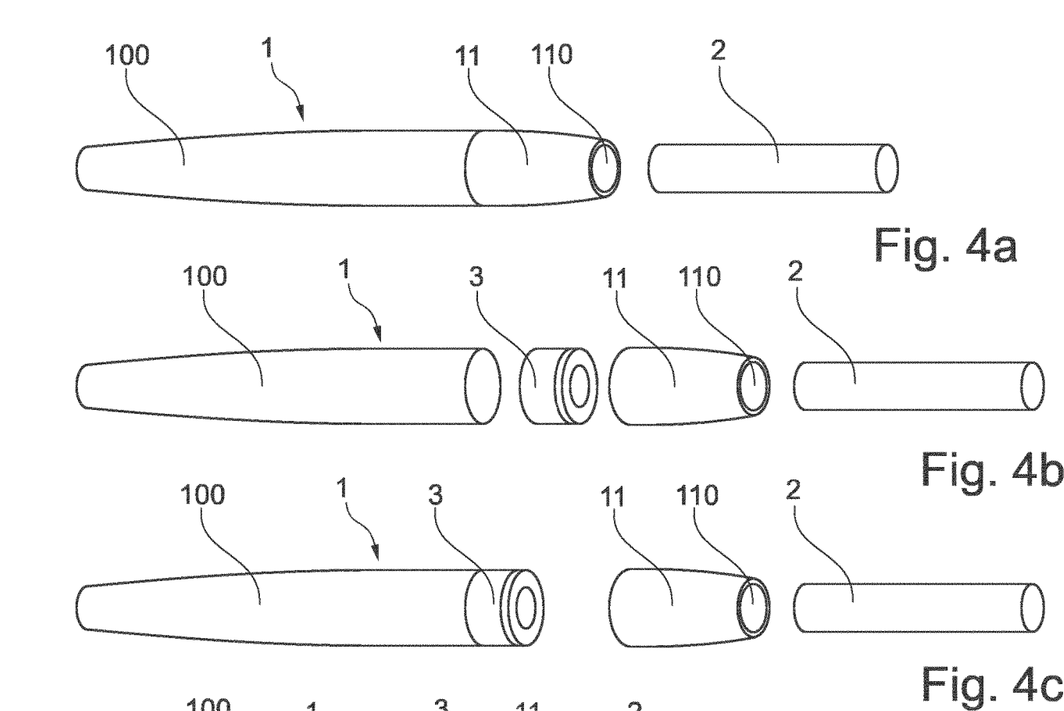
FIG. 4a is a schematic and exemplary view of an embodiment of an assembled aerosol and flavor generating device without a replaceable module according to the present disclosure and an aerosol generating article according to the present disclosure.
FIG. 4b is a schematic and exemplary exploded view of an embodiment of an aerosol and flavor generating device, a replaceable module and an aerosol generating article according to the present disclosure.
FIG. 4c is a schematic and exemplary partially assembled view of an embodiment of an aerosol and generating device, a replaceable module and an aerosol generating article according to the present disclosure.
Figure 4D:
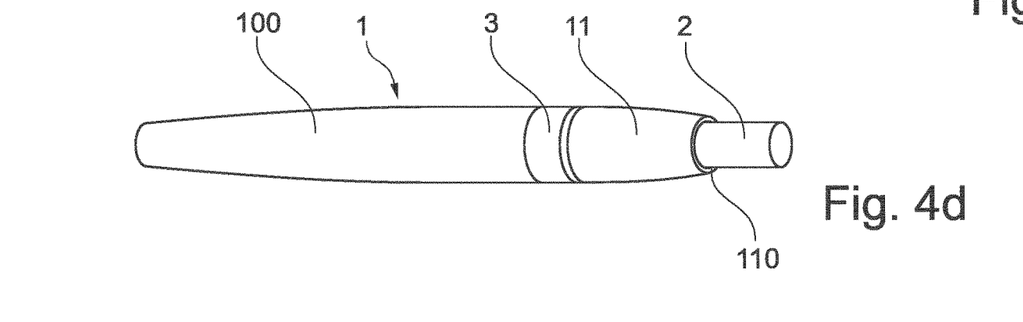
FIG. 4d is a schematic and exemplary assembled view of an embodiment of an aerosol and flavor generating device, a replaceable module and an aerosol generating article according to the present disclosure.

FIG. 4a shows an embodiment of the aerosol and flavor generating device 1 without a replaceable module 3. In this Figure, the power system 100 is directly coupled to the holder 11. The holder has an opening 110 for receiving the aerosol generating article 2. FIG. 4b shows an exploded view of the aerosol and flavor generating device 1 according to the present disclosure with the replaceable module 3 arranged between the power system 100 and the holder 11. FIG. 4c shows the aerosol and flavor generating device 1 of FIG. 4b, wherein the replaceable module 3 is connected to the power system 100. FIG. 4d shows the embodiment of FIGS. 4b and 4c, in which the module 3 is connected to the power system 100 as well as to the holder 11. Further, the aerosol generating article 2 is partially accommodated in the opening 110 of the holder 11. Thus, the assembly of the aerosol and flavor generating device 1 and the aerosol generating article 2 as shown in FIG. 4d is ready for use.

Figure 5:
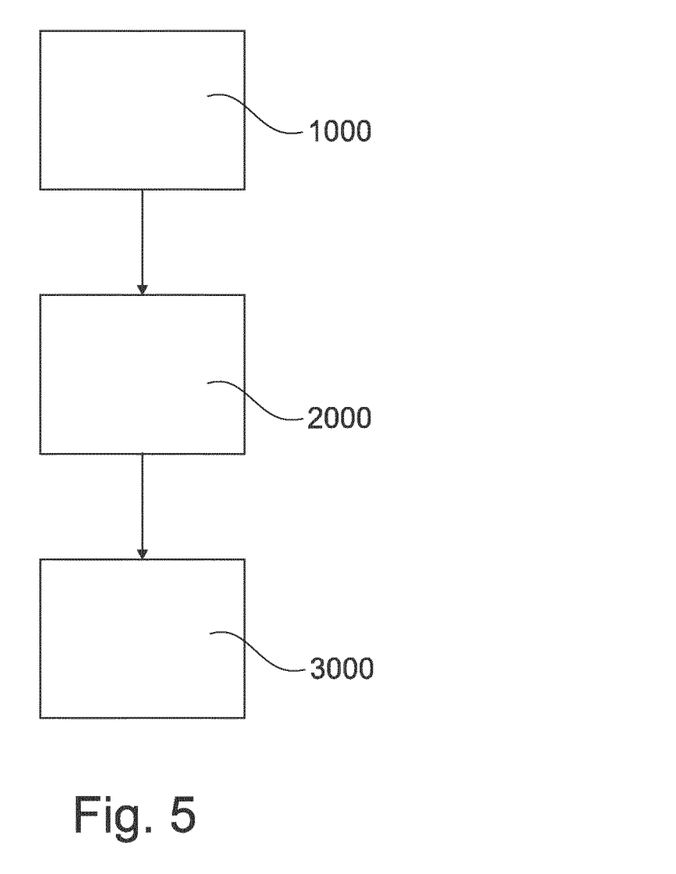
FIG. 5 is a schematic flow chart of a method of providing an airflow according to the present disclosure.

FIG. 5 shows a flow chart of a method of providing an airflow through the replaceable module 3 assembled to the aerosol and flavor generating device 1 according to the present disclosure. In a first step 1000, the replaceable module 3 is placed into the aerosol and flavor generating device 1. In use, an airflow through the replaceable module 3 and the aerosol and flavor generating device 1 is generated, e.g. by puffing of a user. A first portion of the airflow is supplied through the air outlet 333 of the replaceable module 3 to the aerosol generating article 2 (step 2000) and thus accessible to a user's mouth. A second portion of the airflow is supplied through the flavor generating article 6 and exits through the opening(s) 31 of the replaceable module 3 (step 3000). Thus, the second portion of the airflow is accessible to a user's nose.

For the purpose of the present description and of the appended claims, except where otherwise indicated, all numbers expressing amounts, quantities, percentages, and so forth, are to be understood as being modified in all instances by the term "about". Also, all ranges include the maximum and minimum points disclosed and include any intermediate ranges therein, which may or may not be specifically enumerated herein. In this context, therefore, a number A is understood as A±20% of A. Within this context, a number A may be considered to include numerical values that are within general standard error for the measurement of the property that the number A modifies. The number A, in some instances as used in the appended claims, may deviate by the percentages enumerated above provided that the amount by which A deviates does not materially affect the basic and novel characteristic(s) of the claimed disclosure. Also, all ranges include the maximum and minimum points disclosed and include any intermediate ranges therein, which may or may not be specifically enumerated herein.

Although illustrative examples of the present disclosure have been described above, in part with reference to the accompanying drawings, it is to be understood that the disclosure is not limited to these examples. Variations to the disclosed examples can be understood and effected by those skilled in the art in practicing the disclosure, from a study of the drawings, the specification and the appended claims.

In the claims, any reference signs placed between parentheses shall not be construed as limiting the claim. The term "comprising" does not exclude the presence of elements or steps other than those listed in a claim. The word "a" or "an" preceding an elements does not exclude the presence of a plurality of such elements. The disclosure can be implemented by means of hardware comprising several distinct elements. In the device claim enumerating several means, several of these means can be embodied by one and the same item of hardware. The mere fact that certain measured are recited in mutually different dependent claims does not indicate that a combination of these measure cannot be used to advantage.

The invention claimed is:

1. A replaceable module for an aerosol- and flavor-generating device, the replaceable module comprising:
   an air chamber comprising
      at least an air inlet configured for an entrance of an airflow into the air chamber,
      an air outlet configured for an exit of a first portion of the airflow out of the air chamber, wherein the air outlet is further configured to be connected to an aerosol-generating article to direct the first portion of the airflow through the aerosol-generating article, at least one opening arranged at a circumference of the air chamber and configured for an exit of a second portion of the airflow radially out of the air chamber, a holding unit configured to hold a flavor-generating article between the air inlet and the at least one opening, and a turbulence-generating unit arranged between the air inlet and the opening to block the airflow at least partially to cause a turbulent airflow in the air chamber close to the at least one opening during puffing.

2. The replaceable module according to claim 1, further comprising the flavor-generating article.

3. The replaceable module according to claim 1, wherein the holding unit comprises a distal grid element and a proximal grid element configured to hold the flavor-generating article between the distal grid element and the proximal grid element.

4. The replaceable module according to claim 3, wherein the turbulence-generating unit is less penetrable for the airflow than the proximal grid element.

5. The replaceable module according to claim 1, wherein the at least one opening is a nasal airflow passage configured to be accessible to a nose of a user.

6. The replaceable module according to claim 1, wherein the air chamber further comprises a plurality of openings.

7. The replaceable module according to claim 1, wherein the air chamber further comprises a shutter skirt, which is moveable relative to the at least one opening to close the at least one opening.

8. A heating system for aerosol- and flavor-generating device, comprising a replaceable module according to claim 1 and a heating unit configured to heat an aerosol-generating article, wherein the replaceable module is reversibly connectable to the heating unit, and wherein an air outlet of the replaceable module is further configured to be connected to the aerosol-generating article.

9. The heating system according to claim 8, wherein the heating unit comprises an induction-heating element configured to be inserted into the aerosol-generating article.

10. The heating system according to claim 8, wherein the heating unit comprises a peripheral heating socket configured to surround the aerosol-generating article at least partially.

11. An aerosol- and flavor-generating device, comprising a heating system according to claim 8 and a power system, wherein the power system is configured to provide energy to the heating system, and wherein the replaceable module is reversibly insertable between the power system and the heating system.

12. A method of providing an airflow through a replaceable module for an aerosol- and flavor-generating device, comprising:

providing a replaceable module according to claim 1;

supplying a first portion of an airflow through an aerosol-generating article connected to an air outlet of the replaceable module; and/or supplying a second portion of the airflow through a flavor-generating article held by the replaceable module and through the at least one opening of the replaceable module.

13. The method according to claim 12, wherein, during puffing by a user, the first portion of the airflow is accessible to a mouth of the user and the second portion of the airflow is accessible to a nose of the user.

14. The method according to claim 12, wherein, without puffing by a user, only a part of the second portion of the airflow is provided and accessible to a nose of the user by means of diffusion from the flavor-generating article to the user's nose.

* * * * *